Patented Mar. 16, 1943

2,314,181

UNITED STATES PATENT OFFICE 2,314,181

BITUMINOUS MATERIAL

Hans F. Winterkorn, Columbia, Mo., assignor to The Quaker Oats Company, Chicago, Ill., a corporation of New Jersey No Drawing. Application November 21, 1938, Serial No. 241,642

10 Claims. (Cl. 260—28)

The present invention relates to an improvement in bituminous compositions used for the preparation of weather-resisting surfaces, such as roofs, and load-bearing surfaces as, for example, roadways, pavements, airplane runways, and the like. More particularly, it relates to an improved bituminous foundation, paving or surfacing composition and to a method of producing same.

The wearing and weather-resisting qualities of a bituminous surface are dependent in part on the thoroughness with which the bitumen is incorporated with the aggregate or soil and in part upon the affinity of the aggregate or soil for the water-proofing and binding agent. Different types of aggregate vary widely in the ease and thoroughness with which they may be incorporated with bituminous material. Thus, for example, most of the gravel found from north Missouri to Wyoming and Montana has little affinity for bituminous binder. Likewise, highly alkaline soils in which the sodium ion is present in substantial amounts, or soils to which sodium chloride has been added, are extremely difficult, if not impossible, to thoroughly incorporate with bitumen, according to methods of the prior art. The results of bituminous treatment differ with various aggregates. One reason for this is the failure of the bitumen to completely envelop the aggregate or soil particles. The result is a considerable reduction in the ability of the composition to resist destructive deformation and deterioration due to the combined effects of weather and hard use. For these and other reasons, previous attempts to produce bituminous surfaces have been only partially successful.

One object of the present invention is to provide a method of increasing the strength of the bond between aggregate material and bitumen.

Another object is to provide a method for the construction of bituminous surfaces characterized by increased resistance to weathering and usage.

Another object is a method of increasing the wetting power of bituminous material for mineral aggregate employed in the construction of bituminous load-bearing surfaces.

Another object is a method for constructing a load-bearing surface such as a roadway, characterized by increased stability and resistance to moisture.

A further object is to provide a bituminous composition wherein the mineral aggregate is uniformly coated with bituminous binder.

Other objects will be apparent as the invention is hereinafter more fully described.

These objects are accomplished by incorporating with the aggregate or bitumen an ingredient, ingredients which immediately or ultimately may interact to form resins, having great affinity for the aggregate, thereby augmenting the protective action of the bitumen. This ingredient or the resinous film formed by it and coated on the aggregate acts to greatly improve the affinity of the particles for the bitumen. In addition, the bitumen appears to modify the resin so that a plastic composition is obtained which progressively becomes more resistant to disintegrating forces. I have found that, in general, the resins derived from the aldehydes are most satisfactory for my purpose.

For the foregoing reasons I prefer to employ, as a precoating, wetting and bond-improving agent, a composition comprising (1) an aldehyde and (2) material capable of reacting with the aldehyde to form a water-resistant resinous product. As the aldehyde, formaldehyde, acetaldehyde, crotonaldehyde, acrolein, butyraldehyde, benzaldehyde, furfural, and the like may be mentioned by way of example. For the second component of my preferred agent, the following may be mentioned for purposes of illustration: phenols, including phenol, cresol, resorcinols, and xylenols; amines, for example, aniline, toluidine, naphthylamine; ketones, such as acetone, methyl ethyl ketone, and cyclohexanone; sulfonamides, such as toluene sulfonamide; naphthols, such as alpha and beta naphthol; urea and substituted ureas; lignin, and various other materials. While, of course, many combinations of these materials are possible, one of my preferred compositions is furfural with aniline or phenolic compounds since the resultant resin is characterized by especially desirable properties.

If the bitumen employed is of such a character that it is capable of reaction with the aldehyde, then the aniline, phenolic substance, ketone, or other reactant may be eliminated or substantially reduced in amount. For example, coal tars and pitches, containing appreciable amounts of substances that react with furfural and other aldehydes, are sometimes employed in building roads, and in these cases the aldehyde may be added to, or otherwise used with, the bituminous material or aggregate without incorporation of further quantities of materials capable of reacting therewith.

Even in those cases where the bitumen is not believed to contain any substantial quantity of material capable of reacting with aldehydes, it is often possible to use furfural without addition of other resin-forming agents. The improved adhesiveness of the bitumen for the aggregate, observed when furfural is used without the other agents, is believed to be due to the wetting action of the aldehyde itself and to the effect of a resinous material which forms by polymerization of the furfural.

The incorporation of the bond-improving agents may be carried out in many ways in accordance with my invention. For example, in employing furfural and aniline as the addition compounds, I may spray the aggregate with a mixture of furfural and aniline, and follow this with the incorporation of the bitumen. Alternatively, I may spray the aggregate with furfural, and incorporate the aniline in the bitumen, which is then mixed with the aggregate. Still another method comprises adding both the furfural and the aniline to the bitumen, then mixing this composition with the aggregate.

If furfural alone is used, the application of the furfural may be made prior to, or at substantially the same time as the application of the bituminous substance. It may be mixed with the bitumen or applied separately.

In many cases the most efficient form of my invention is the precoating process. If the addition agents are to be mixed with the bitumen, it is necessary that the time element be considered. That is to say in order to realize the benefits of the new method and product, it is imperative that incorporation of the addition agents be made in such a manner that reactions between the ingredients are minimized prior to mixing with the aggregate. I do not want to obtain an artificial resin dispersed in the bitumen, or serving as a lyophilic coating for the dispersed phase, but what I do intend is to form an interface—believed to be a resinous product—between the aggregate and the bitumen. This is accomplished by adding the new agents to aggregate prior to coating with bitumen, or the new agents may be mixed with the bitumen just before the incorporation of the bitumen with the aggregate. The time elapsed between the addition of the new agents to the bitumen, and the mixing of the bitumen with the aggregate should be short enough to prevent any substantial reaction between the bitumen and the added agents or polymerization of said agents. By the same token it is not desirable to heat bitumen containing the addition agents to any considerable temperature.

The addition of a synthetic resin, or ingredients which form such a resin in the asphalt prior to mixing it with the aggregate, is not new in the art. The addition of resins of this kind, or the formation of them in the bitumen in order to increase its hardness, raise the melting point of the asphalt, reduce checking or altering the chemical characteristics of the bitumen, has been proposed, but the purpose, method, and results are entirely different from my process wherein the reactions and condensations occur in the presence of an aggregate. The composition obtained is believed to be entirely different from anything proposed heretofore.

In one experiment, aniline and the furfural were condensed with each other and then added to bitumen, after which the resultant composition was mixed with aggregate materials. The composition so obtained was substantially inferior and by no means equivalent to the product obtained by adding the furfural and the aniline to the bitumen and then mixing this with the aggregate while all the ingredients were in substantially unreacted form. This clearly demonstrates that the simple addition of synthetic resin in the bitumen prior to mixing with the aggregate is not enough to produce the results obtained in my process.

The percentage of the addition agents which may be used varies considerably, but in the preferred embodiment of the invention, the quantities employed are from 0.1 to 10% of aldehyde and from 0.1 to 10% of the phenol, amine, ketone, amide or other reactant, based on the amount of bitumen employed. In general the ratio of aldehyde to the other component is about 1:1 molecular proportions, although in some cases it is desirable to increase or decrease the respective amounts of the various components.

A better understanding of certain fundamental principles underlying my invention will be possible if it is borne in mind: First, that the adhesion of bitumen to mineral aggregates is generally improved by the addition of certain aldehydes, furfural being a preferred example. Second, that the weather-resisting properties of aggregate-bitumen compositions are improved and augmented by the formation in situ (i. e., in contact with the aggregate) of resinous materials. Furfural is one of the preferred weather-resisting resin components, for I have not only discovered new and improved wetting agents, but those agents serve the additional purpose of forming weather- and age-resisting resins.

In order to disclose more clearly how the present invention may be carried out, specific examples will now be given. It should be understood, however, that this is done solely for the purpose of illustrating the principles of the invention.

*Example I*

The following is an example of the preparation of an intermediate type of bituminous road: 500 gallons of a medium curing petroleum cutback asphalt are heated to 110°–130° F. and 6 gallons of aniline and 4 gallons of furfural are added thereto, with sufficient agitation to insure mixing. This mixture is promptly added to 20–25 tons of mineral aggregate, silt and loam, together with sufficient water to facilitate mixing, and the entire mass mixed in a pug mill. A suitable device for carrying out this step is a machine known as a Barber-Green mixer. The mixed material leaving the machine is partially spread over the surface of the road and the water allowed to evaporate, after which the treated soil and aggregate is spread further and finally rolled out to form a hard smooth surface. A topping or wearing surface comprising a rapid curing petroleum asphalt may then be applied, pea gravel being distributed over the asphalt, if desired.

In this example and others included herein it is understood that the addition agents are kept in substantially unreacted form prior to mixing the bituminous composition with the aggregate. Where precoating is used the time element is not of such great importance.

*Example II*

An improved bituminous primer or base for a roadway may be prepared in the following manner: 5 gallons of aniline and 6 gallons of furfural are added to 500 gallons of MC-1 bituminous binder, and mixed, either in a mixing tank or in the supply tank or spreader. This bituminous mixture is spread on the surface of the road in an amount of from .15 to .30 gallon per square yard prior to the application of a bituminous armor-coat, mat or pavement. The primer containing the aniline and furfural will make for a better adhesion of the bituminous top to the base. It is of special value in case the base underlying the bituminous surface contains soluble alkali, either naturally present in the soil or added in a stabilization process.

Example III

The mineral aggregate to be used in the bituminous mat is graded into a windrow on the road. This windrow is flattened out to a width of about 12 feet. The bituminous material, which may be an MC or SC road oil, is then applied with the spray bar approximately 10 feet in width. The application is to be made in two treatments, the first not exceeding one-half of the total quantity of bitumen involved. To the bituminous material used in the first treatment from 4 to 12 gallons of furfural and from 6 to 18 gallons of aniline are added for each 1,000 gallons of bituminous material. The total amount of bitumen used in the final paving mixture varies from 4% to 10%, depending upon the gradation of the aggregate and the type of the mat. The total amount of aniline and furfural in the mixture will vary accordingly from about $\frac{1}{50}\%$ to about $\frac{1}{2}\%$ of the total mixture. The bitumen and aggregate are then mixed with the help of a spring tooth harrow or other suitable equipment and with multiple blade maintainers or blade graders. After thorough mixing the bitumen-aggregate system is compacted by suitable rollers.

Example IV

Mineral aggregate which is to be used for a hot asphaltic mix and which is dried at temperatures between 250° and 375° preparatory to mixing is sprayed with a mist-like application of a solution of 20 gallons of cresylic acid in 80 gallons of furfural. Also other ratios can be used, depending upon the maximum temperature of heating and the vapor pressure of the solution. The spraying can be done preparatory to the heating or after the heating of the aggregate, before it reaches the batching hopper. The amount of activator used in the final paving mixture will vary from $\frac{1}{100}$ of one per cent to $\frac{1}{2}$ of one per cent, depending upon the gradation of the aggregate and the amount of fines.

Example V

A mineral aggregate which is to be used in either hot or cold mix construction is sprayed, at the place of its production, with a 10% to 50% solution of aniline, or phenol or cresylic acid or diphenylamine in furfural. The amount of activating mixture thus used may vary from less than $\frac{1}{100}$ of a per cent to $\frac{1}{2}$ of a per cent of the weight of the final paving mixture, depending upon the gradation of the aggregate, the amount of fines, and the efficiency of the spraying outfit.

Example VI

A windrow of graded aggregate, which is to be used for the construction of a bituminous pavement, is flattened out to a width of about 12 feet and is sprayed with a mist of aniline and furfural in the ratio 1:1. To avoid clogging of the fine openings of the spray bar by the reaction product of furfural and aniline, the two liquids can be applied through separate spray bars. The amount of this mixture to be applied per cubic yard of aggregate is 0.25 to 2 gallons according to the amount of fines in the aggregate. After this spraying the windrow is put back into its original shape, and some time permitted for the aniline-furfural to penetrate through the system before the bituminous treatment takes place.

Example VII

An emulsion containing 50% of bitumen, 1.5% of a mixture of 50 parts aniline and 100 parts of formalin is applied by means of a spreader of the Ingles or any other suboiler type machine to aggregate (60% through No. 40 screen) at the rate of 9 lbs. of emulsion to 100 lbs. of aggregate. The presence of the aniline and formaldehyde will promote a more uniform penetration throughout the soil material and will permanently improve the adhesion of the bitumen to the soil constituents. Calculation will show that there has been added the equivalent of 7.5 lbs. of bitumen and 0.225 lbs. of activators to each 100 lbs. of aggregate passing a No. 40 screen.

I do not intend to be limited to the exact proportions given above, for I have found that the emulsion may contain varying quantities of bitumen, may contain from 0.1% to 2% of the activators and that the bitumen may vary from 6-8% of the weight of aggregate passing a No. 40 screen.

Example VIII

For the preparation of water resistant adobe or other soil bricks, the soil is treated by mixing with an emulsion of bituminous materials containing 0.1 to 4% of a mixture of 16 parts of urea, 60 parts of aqueous formaldehyde, and 24 parts of butanol. After drying the bricks should contain from 2 to 8% of bituminous material, the proper amount depending on the amount of clay and colloidal matter in the soil. Instead of the formaldehyde, furfural can be used under proper change of the proportions.

Example IX

Mineral aggregate to be used in the construction of a bituminous pavement by inverted penetration is treated with 0.25 to 2 gallons per cubic yard of a mixture of 50 parts of furfural and 50 parts of aniline. These liquids can also be applied simultaneously through separate spray bars. This treatment will aid in proper inverting.

Example X

An aggregate which is to be used for a hot or cold bituminous mix, before the mixing or the heating is dipped into a solution of 10 parts of phenol in 90 parts of furfural; then the solution is permitted to drain off and the aggregate is used.

Example XI

An aggregate which is to be used in a cold mixed bituminous pavement is either dipped in or sprayed with furfural, and the excess liquid drained, immediately preceding the application of bituminous material in amounts of 4 to 10%, depending on the aggregate employed. In the subsequent mixing either one of the commercial stationary or mobile plants can be used or the mixing can be performed on the road by harrows and blades.

Obviously it is impossible to give examples of all the various combinations embodied in the broad principles of this invention. Thus to mention another treatment not specifically described in the above examples, I can prepare water resistant soil bricks by moistening the soil with an aqueous solution of aniline-furfural or aniline-formaldehyde, forming, drying and subsequent immersion in a heated penetration asphalt or in a cutback asphalt. The final bricks may have a content of 0.1 to 5.0% of the activation liquids and from 2 to 8% of bituminous material.

To mention still another—the oiling of earth roads is often done by the spraying in two applications of one gallon of road oil per square yard. To effect better penetration of the bitumen into the soil and to increase their mutual affinity, an aqueous solution containing from 0.5 to 8% of a water soluble mixture of furfural with phenol, aniline, cresylic acid, or similar substances is spread on the road preceding or simultaneously with the first application of the oil. The amount and concentration of the aqueous solution and the amount of the simultaneously applied oil has to be varied according to the physical properties of the soil in order to prevent loss of the materials by flowing to the shoulders. For many soils good practice is: simultaneous application of a third of a gallon of a 4% activator solution and .4 gallon of an SC oil per square yard. This treatment should be followed by spraying of .6 gallon of SC oil in either one or two applications. The aqueous solution containing the activators improves the penetration of the bitumen into the road, and also improves the adhesiveness of the bitumen to the mineral aggregate.

However, enough examples have been given to indicate that furfural may be added with or without aniline, phenol, urea, or other reacting compounds either to bitumen or to aggregate before or simultaneously with the mixing. In the preceding examples furfural may be substituted for the other aldehydes mentioned.

The term "aggregate" as used herein has reference to the class of substances comprising partially disintegrated products of rocks, usually but not always mixed with organic matter. Examples of materials included under this designation are sand, clay, loam, dust, filler, shale, peat, gravel, crushed stone, mantle rock, gumbo, mixtures thereof, and similar materials.

By the term "bituminous materials" or "bitumen" I refer to any mixtures of hydrocarbons of natural or pyrogenous origin, or a mixture of both, accompanied by their nonmetallic derivatives, and which may be liquid, semi-solid, or solid. Examples of such materials are road oils, cut-backs, emulsified asphalt, penetration asphalts, and also tars and pitches derived from either coal or petroleum. This definition includes the so-called "native" asphalts, containing natural or artificial mineral admixtures with the bitumen, and exemplified by Trinidad, Cuban, Bermudez, or other natural asphalts. The tars and pitch are ordinarily obtained from destructive distillation of coal and petroleum. Petroleum asphalts are normally derived from petroleum by either vacuum or steam reduction. To this petroleum bitumen it is frequently necessary to add a solvent or emulsifying agent plus water in order to liquefy solid or semi-solid material, thus converting it into a substance that is readily handled in the road-constructing processes. With some bitumen heat alone may suffice to produce liquefaction, and in this event no emulsions or solutions need be prepared.

From the foregoing detailed description it is apparent to anyone skilled in the art that many variations may be made without departing from the spirit and scope of the invention. I therefore intend to be limited only in accordance with the following patent claims.

I claim:

1. A paving or surfacing composition of the character described comprising mineral aggregate, a bituminous material and furfural in the form of an interfacial film substantially at the interface between said aggregate and said bituminous material.

2. An aggregate material for bituminous paving or surfacing composition, comprising mineral aggregate having a film of furfural on the surface thereof.

3. A method of improving paving or surfacing compositions containing aggregate and a bituminous material, which comprises mixing the aggregate with said bituminous material in the presence of an unresinified organic resin-forming material comprising an aldehyde having not substantially more than seven carbon atoms, said resin-forming material being substantially unresinified at the time of the mixing of the aggregate with the bituminous material.

4. A method of improving paving or surfacing compositions containing an aggregate and a bituminous material, which comprises mixing the aggregate with bituminous material in the presence of a resinifiable aldehyde containing not substantially more than seven carbon atoms and which is substantially unreacted at the time of the mixing of said aggregate and said bituminous material.

5. A method of improving paving or surfacing mixtures containing an aggregate and a bituminous substance, which comprises mixing the aggregate and the bituminous substance in the presence of furfural which is substantially unreacted at the time of mixing of said aggregate and said bituminous substance.

6. A method of improving paving or surfacing compositions containing an aggregate and a bituminous substance, which comprises incorporating in said bituminous substance a substantially unresinified resin-forming material comprising an aldehyde having not substantially more than seven carbon atoms and thereafter mixing said aggregate in said bituminous substance before said unresinified resin-forming material has resinified.

7. A method of improving paving or surfacing compositions containing an aggregate and a bituminous substance, which comprises incorporating a small proportion of furfural in said bituminous substance and thereafter incorporating said aggregate in said bituminous substance before said furfural has resinified.

8. A method of improving paving or surfacing compositions containing an aggregate and bitumen which comprises treating said aggregate with an unresinified resin-forming material comprising an aldehyde having not substantially more than seven carbon atoms and thereafter incorporating said aggregate with said bitumen before said resin-forming material has resinified.

9. A method of improving paving or surfacing compositions containing an aggregate and bitumen which comprises treating said aggregate with a resinifiable aldehyde comprising not substantially more than seven carbon atoms and thereafter incorporating said aggregate with said bitumen before said aldehyde has resinified.

10. A method of improving paving or surfacing compositions containing an aggregate and bitumen, which comprises mixing said aggregate with furfural and thereafter incorporating said aggregate with said bitumen.

HANS F. WINTERKORN.